United States Patent
Lee

(10) Patent No.: US 6,910,771 B1
(45) Date of Patent: Jun. 28, 2005

(54) POLARIZED LIGHT CONVERTING DEVICE AND METHOD

(75) Inventor: Jong-Soo Lee, Chunan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

(21) Appl. No.: 09/550,713

(22) Filed: Apr. 17, 2000

(30) Foreign Application Priority Data

Jul. 21, 1999 (KR) ........................................ 1999-29639

(51) Int. Cl.[7] ...................... G02F 1/1335; G03B 21/14; G03B 21/00; G03B 21/26; G02B 5/30
(52) U.S. Cl. ........................ 353/20; 353/31; 353/34; 353/37; 349/8; 349/9; 359/483; 359/489
(58) Field of Search ........................... 353/20, 31, 33, 353/34, 37; 349/8, 9; 359/483, 487, 488, 489

(56) References Cited

U.S. PATENT DOCUMENTS

| | | | |
|---|---|---|---|
| 5,446,510 A | * | 8/1995 | Mitsutake et al. ............ 353/20 |
| 5,900,973 A | * | 5/1999 | Marcellin-Dibon et al. .. 359/487 |
| 6,072,628 A | * | 6/2000 | Sarayeddine ................ 359/487 |
| 6,259,559 B1 | * | 7/2001 | Kobayashi et al. ......... 359/485 |

* cited by examiner

*Primary Examiner*—Judy Nguyen
*Assistant Examiner*—Melissa J Koval
(74) *Attorney, Agent, or Firm*—Robert E. Bushnell, Esq.

(57) ABSTRACT

An integrally-formed polarized light converting device of a projection display unit comprises a medium of a predetermined thickness converting incident light entering at the Brewster Angle into light having a phase difference of $\lambda/2$ and a polarized light separating film reflecting a S polarized light wave and transmitting a P polarized light wave from the incident light entering at the Brewster Angle by a coated front side and a coated back side of said medium. A polarized light separating film having a coated front side reflects the S polarized light wave and transmits the P polarized light wave from the incident light entering at the Brewster Angle. The transmitted P polarized light wave has a phase difference of $\lambda/2$ when transmitted through a medium of predetermined thickness and proceeds in the same direction as the S polarized light wave reflected by the polarized light separating film.

15 Claims, 2 Drawing Sheets

POLARIZED LIGHT CONVERTING DEVICE AND METHOD

CLAIM OF PRIORITY

This application makes reference to, incorporates the same herein, and claims all benefits accruing under 35 U.S.C. §119 from the inventor's application POLARIZATION SEPARATING AND CONVERTING GLASS OF PROJECTION DISPLAY UNIT filed with the Korean Industrial Property Office on 21 Jul. 1999 and there duly assigned Serial No. 29639/1999.

BACKGROUND OF THE INVENTION

1. Field of the Invention

The present invention relates to a visual projection display unit, and more particularly to a polarized light converting device in which a polarized light separator and a polarized light converter are integrated to increase optical efficiency.

2. Description of the Prior Art

A visual projection system such as a projection television and a video projector produce images from a visual display means. The latter may be a specially manufactured small cathode-ray tube (CRT), liquid crystal display (LCD) device, or polymer dispersion liquid crystal display (PDLCD) panel. A visual projection system obtains a large-sized screen from the original image by using a projector lens.

FIG. 1 is a view showing an optical system of a known projection display unit using a conventional polarization beam splitter. As shown in FIG. 1, a prior art projection display unit 10 comprises a light source 11, a polarization beam splitter 12 (hereinafter referred to as PBS) which receives a light beam L projected from light source 11. The PBS separates a reflected S polarized light wave 18 and a transmitted P polarized light wave 19 from the incident light beam L. A plate reflecting mirror 13 then reflects S polarized light wave 18 to proceed in the same direction as P polarized light wave 19 and parallel thereto. A polarized light converter 14 of a half-wavelength plate-converting phase, having a phase difference of λ/2, then transmits S polarized light wave 18, slot hat its phase legs that of P polarized light wave 19 by a half wavelength.

Projection display unit 10 further comprises a condenser 15 for condensing P polarized light wave 19 and S polarized light wave 18 after they are transmitted through the half wavelength plate. Then, a liquid crystal display (LCD) device 16 transmits light projected from condenser 15 to a projector lens unit 17, which projects an incident light L2 onto a screen (not shown) as an enlarged image.

Thus, when a light L projected from light source 11 enters into PBS 12, projection display unit 10 separates L into two polarized light components. Unit 10 transmits a P polarized light wave and reflects an S polarized light wave. The transmitted P polarized light wave enters into the LCD device. At the same time, the reflected S polarized light wave is converted into a P polarized light wave by polarized light converter 14, and then, enters the same LCD device.

FIG. 2 is a view showing a further construction of an optical system of a projection display unit using a conventional polarization separating glass. As shown in FIG. 2, a projection display unit 20 using a conventional polarization separating glass comprises a light source 21 providing a light beam L, a polarization separating medium 22 which separates reflected S polarized light wave 28 and transmitted P polarized light wave 29 from light L projected from the light source 21. A plate reflecting mirror 23 reflects P polarized light wave 29 in the same direction as S polarized light wave 28 and parallel thereto. A polarized light converter 24 of a half-wavelength plate-converting phase transmits S polarized light wave 18, which has changed its direction by the action of reflecting mirror 23 and has a phase difference of λ/2.

Projection display unit 20 further comprises a LCD device 25 for transmitting the P polarized light wave 29 and the S polarized light wave. A projector lens unit 27 projects an incident light L1 onto a screen(not shown) as an enlarged image.

Thus, when a light projected from the light source enters the polarization separating medium, the projection display unit separates two polarized light components. It transmits a P polarized light wave and reflects a S polarized light wave. The reflected S polarized light wave enters the LCD device. The direction of the transmitted P polarized light wave is changed by the reflecting mirror, and the transmitted P polarized light wave is converted into a S polarized light wave by polarized light converter 24. Finally, it enters the LCD device.

However, in each instance, the projection display unit is subject to a decrease of 50% in optical efficiency; also using an expensive polarized light converter causes a substantial increase in cost. Further, since a small polarized light separator and a polarized light converter are connected and used at a right angle to the light direction, in order to ensure spatial uniformity of intensity of light, the necessary manufacture and assembling processes are complex and difficult.

It is known that there exists a particular angle of incidence, called the Brewster Angle, $\theta_B$, at which there is zero reflection and complete refraction of the parallel components of the electric field vectors in light incident on a glass or other dielectric surface. The light reflected from the glass, for this angle, is fully polarized and its plane of vibration is normal to the plane of incidence. In this configuration, the reflected and refracted rays of light are perpendicular to one another. Therefore, the angle of reflection ($\theta_B$) and the angle of refraction ($\theta_r$) have a relationship such that $\theta_B + \theta_r = 90$ degrees. This leads to derivation of the Brewster Angle as $$\theta_B + \tan^{-1} \frac{N_{bm}}{N_o}$$

where $N_{bm}$=refractive index of dielectric medium and $N_o$=refractive index of air. See, e.g., Holiday, Resnick, & Walker, *Fundamentals of Physics* 1017–18 ($4^{th}$ ed. 1993).

SUMMARY OF THE INVENTION

Accordingly, it is an object of the present invention to provide an improved polarized light converting device with a simple, less-expensive construction and a simple manufacture and assembling process.

The instant invention accomplishes these objects by integrating the polarized light separator and polarized light converter. The device of the invention provides a polarized light-converting device for a projection display unit, comprising a medium with a predetermined thickness for converting an incident light entering at the Brewster Angle to a light having a phase difference of λ/2 and a polarized light separating film which transmits a P polarized light wave and reflects a S polarized light wave from an incident light entering at the Brewster Angle by a coated front side and a coated back side of the medium. Therefore, from an incident light ray entering at the Brewster angle, a S polarized light wave is reflected and a P polarized light wave is transmitted onto a coating surface of a polarized light-separating film. The transmitted P polarized light wave has a phase difference of λ/2 when transmitted through a medium with predetermined thickness and the wave proceeds in the same direction as the S polarized light wave that is reflected by the polarized light separating film.

According to the present invention, a medium is made of a material having a short light axis and a double refraction, the ordinary refractive index of which is different from an extraordinary refractive index for visible rays.

A polarized light separating film is a thin-film coating for improving the degree of purity of polarized light reflecting a S polarized light wave and transmitting only a P polarized light wave. Also, the thin-film coating is a multi-layered dielectric coating.

To achieve the objects of the present invention, another embodiment provides a polarized light converting device for a projection display unit, comprising a medium with predetermined thickness for converting an incident light entering at the Brewster Angle into light having phase difference of λ/4, a polarized light separating film formed with a thin film coating for increasing the degree of purity which transmits a P polarized light wave and reflects a S polarized light wave from an incident light entering at the Brewster Angle by a coated front side of the medium, and a full reflecting mirror reflecting a light transmitted through the medium by a coated back side of the medium. Thus, from an incident light entering at the Brewster Angle, a S polarized light wave is reflected and a P polarized light wave is transmitted on a coating surface of a polarized light separating film. The transmitted P polarized light wave has a phase difference of λ/4 when transmitted through a medium of predetermined thickness and has a phase difference of λ/4 when transmitted through the medium after being reflected on the reflecting mirror. Consequently, it has a phase difference of λ/2 (i.e., λ/4+λ/4=λ/2), and proceeds in same direction as a S polarized light wave reflected on the polarized light separating film.

According to another embodiment, a medium is made of a material having a short light axis and a double refraction, the ordinary refractive index of which is different from an extraordinary refractive index for visible rays.

A polarized light separating film is a thin film coating for improving the degree of purity of polarized light reflecting a S polarized light wave and transmitting only a P polarized light wave from an incident light. Also, the thin film coating is a multi-layered dielectric coating.

Therefore, the present invention has the advantage of increasing optical efficiency while lowering the cost. This is accomplished by using a medium which simultaneously performs separation and conversion of polarized light.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components.

DETAILED DESCRIPTION OF THE PRESENT INVENTION

Figure 1:
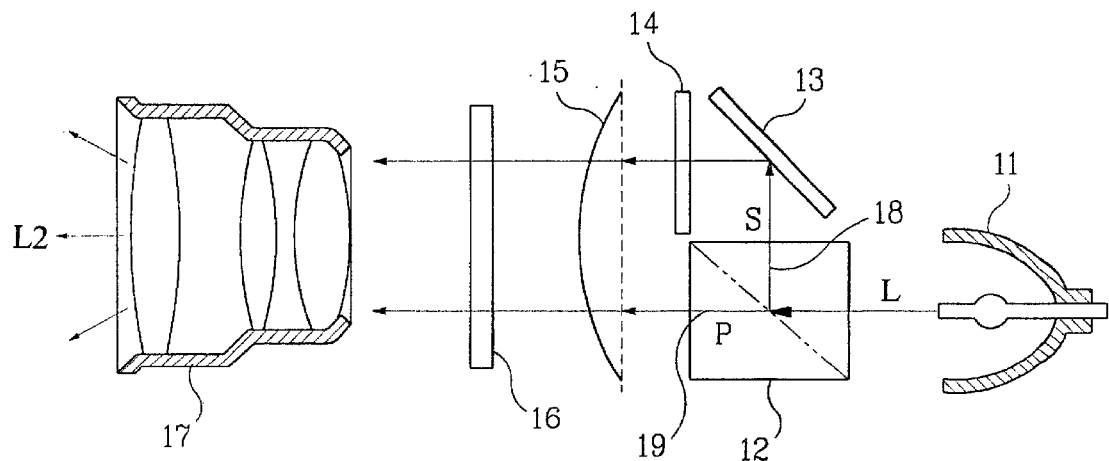
FIG. 1 is a view showing a an optical system of a projection display unit using a conventional polarization beam splitter.
Figure 2:
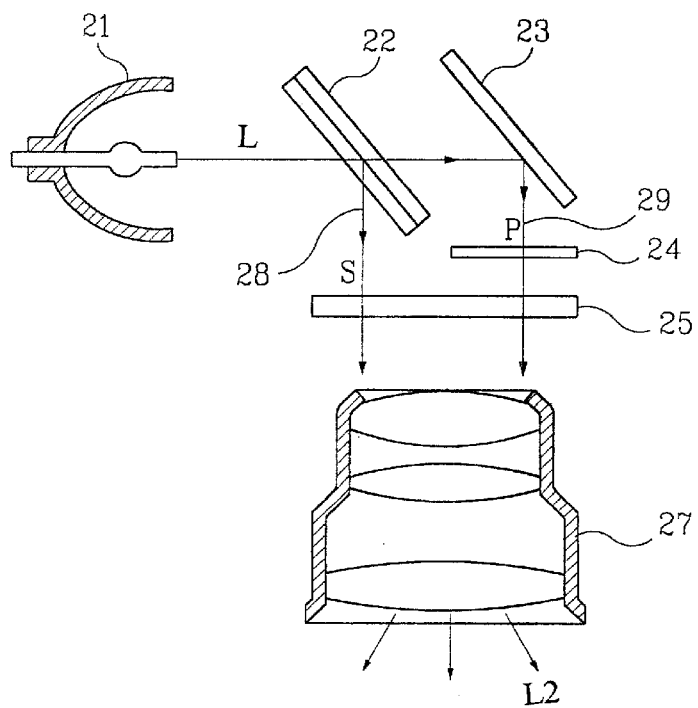
FIG. 2 is a view showing an optical system of a projection display unit using a conventional polarization separating medium.
Figure 3:
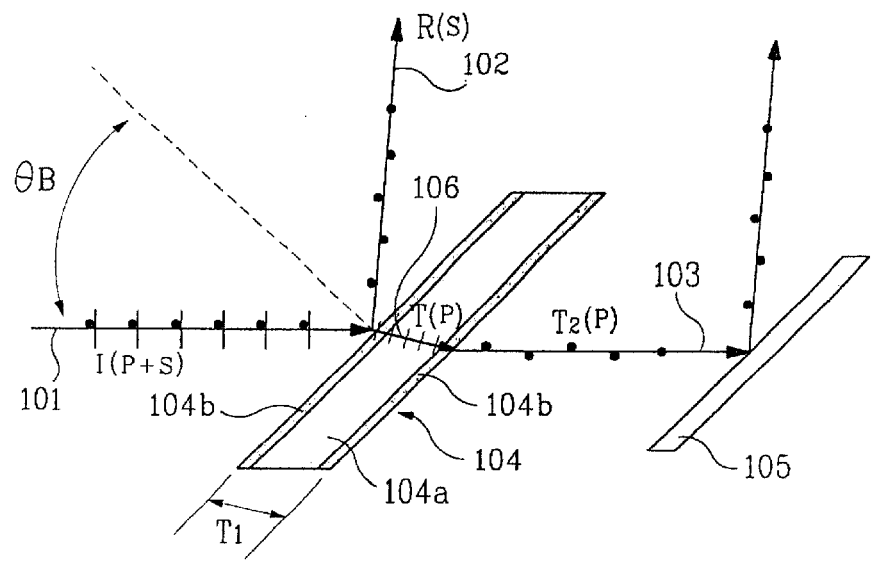
FIG. 3 is a cross-sectional view showing an integrally-formed polarized light converting device of a projection display unit according to the present invention.

Referring to FIG. 3, a cross-sectional view showing a polarized light converting device 104 of a projection display unit according to the present invention is seen. Device 104 is a projection display unit which comprises a medium 104a with a predetermined thickness and a polarized light-separating film 104b, coating the front and back sides of the medium. Medium 104a is made of a material having a short light axis and a double refraction, the ordinary refractive index of which is different from an extraordinary refractive index for visible rays (wavelength of 400–700 nm). As will appear, device 104 is an integrally-formed PBS and delay device (PBSDD) comprising integrally-formed means for separating the incident light beam into a reflected S component and a transmitted P component, and also for changing the direction of the P component in such manner that it is parallel to, and in the same direction as, the S component. (As used hereinafter, the term "integrally formed" refers to a one-piece or unitary article of the type described by the applicants in their specification in *In re Morris*, 127 F.3d 1055, 44 USPQ2d 1023 (Fed. Cir. 1997).)

Preferably, medium 104a is crystalline quartz and has an average refractive index of 1.5506 for light of 550 nm wavelength and a double refractive index of 0.0090 which is the 8 difference between an ordinary refractive index and an extraordinary refractive index. An organic material having a short light axis and a double refraction, such as a polycarbonate film, can also be used as the medium.

An incident Brewster Angle is obtained from the following known equation, where the calculated result is 57.18° for the above described crystalline quartz.

$$\theta_B = \tan^{-1}\frac{N_{bm}}{N_o} \qquad \text{[equation 1]}$$

$\theta_B$=Brewster Angle
$N_{bm}$=average refractive index of a medium
$N_o$=refractive index of air Desired thickness of a medium can be obtained from the Brewster Angle.

$$T_1 = 2d\cos(90°-\theta_B) = 2d\sin\theta_B \qquad \text{[equation 2]}$$

$T_1$=thickness of a medium (104a)
d=thickness generating a phase difference of λ/4 between components of S polarized light wave and P polarized light wave.

A thickness $T_1$ of the medium 104a converts an incident light 101 entering at the Brewster Angle into light having a phase difference of λ/2. The polarized light-separating film 104b has a thin-film coating. The thin-film coating is a multi-layered dielectric coating for increasing the degree of purity which reflects a S polarized light wave R(S) 102 and transmits a P polarized light wave T(P) 106 from the incident light entering at the Brewster Angle.

It is now explained how to operate a polarized light converting device for a projection display unit. Polarized light separating film 104b having a thin film coating at the front side thereof, reflects S polarized light wave R(S) 102 and transmits P polarized light wave T(P) 106 from incident light I(P+S) 101 entering at the Brewster Angle. Transmitted P polarized light wave T(P) 106 has a phase difference of λ/2 when transmitted through the medium and proceeds in the same direction as S polarized light wave T2(P) 103. The direction of converted S polarized light wave T2(P) 103 is changed by a reflecting mirror 105 and proceeds in same direction as S polarized light wave R(S) 102.

Figure 4:
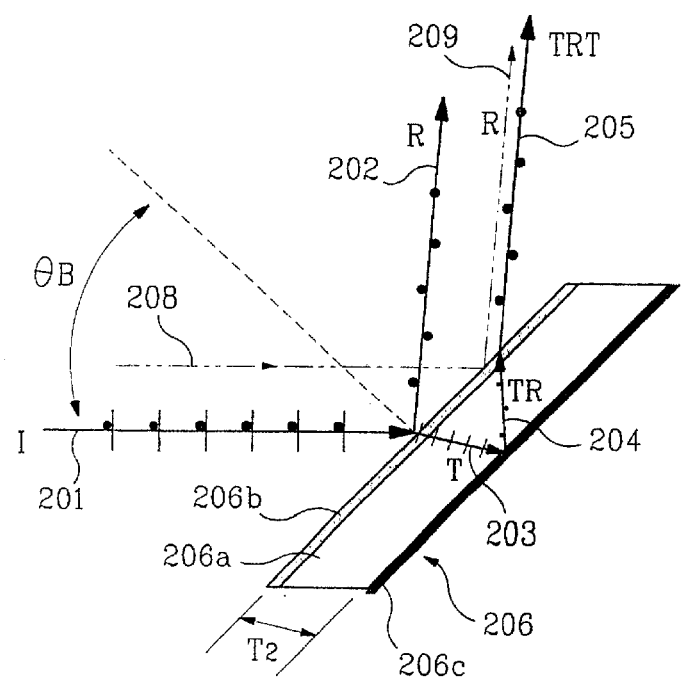
FIG. 4 is a cross-sectional view showing an integrally-formed reflecting type polarized light converting device of a projection display unit according to another embodiment of the present invention.

FIG. 4 is a view showing a reflecting type polarized light converting device for a projection display unit according to another embodiment of the present invention. In this embodiment, no separate mirror is needed because that function is integrated into the above-described PSDD along with the functions already integrated therein. As shown in FIG. 4, a reflecting type integrally formed polarized light-converting device 206 for a projection display unit comprises a medium 206a having a predetermined thickness, a polarized light separating film 206b coating the front side of medium 206a, and a full reflecting mirror 206c coating the back side of medium 206a. Medium 206a is made of the same material having a double refraction or of the same organic material film as medium 104a, its thickness being half that of medium 104a. The thickness of the medium 206a can be obtained from the following equations 3 and 4.

$$\theta_B = \tan^{-1} \frac{N_{bm}}{N_o} \quad \text{[equation 3]}$$

$\theta_B$ Brewster Angle
$N_{bm}$ average refractive index of a medium
$N_o$=refractive index of air $$T_2 = d \cos(90° - \theta_B) = d \sin \theta_B \quad \text{[equation 4]}$$

$T_2$ thickness of a medium (206a)
d=thickness generating a phase difference of λ/4 between components of S polarized light wave and P polarized light wave.

A polarized light-separating film is a thin-film coating. The thin-film coating is a multi-layered dielectric coating for increasing the degree of purity, which reflects S polarized light wave R 202 fully and transmits only a P polarized light wave T 203 from an incident light I201 entering at the Brewster Angle. A full reflecting mirror coating 206c reflects light T 203. (Coating 206c is substantially fully-mirror-reflecting and it substantially fully-mirror-reflects the transmitted P polarized light wave.)

It is now explained how to operate a reflecting type polarized light converting device for a projection display unit of the invention. Polarized light separating film 206b, having a thin film coating at the front side thereof, reflects fully S polarized light wave R 202 and transmits P polarized light wave T 206 from incident light I201 entering at the Brewster Angle. Transmitted light T 203 has a phase difference of λ/4 when transmitted through medium 206a. T 203 with a phase difference of λ/4 again has a phase difference of λ/4 when transmitted through medium 206a after being reflected at full reflecting mirror 206c.

Accordingly, T 203 has a phase difference of λ/2 and proceeds in the same direction TRT 205 as S polarized light wave R 202 reflected at the polarized light separating film. The reflected component indicated in FIG. 4 as element 209 is found to be negligible relative to the other components.

It is thus seen that the present invention has the advantage of increasing optical efficiency while lowering cost, by its using an integrally-formed device which simultaneously performs separating and converting of polarized light, in an integrally-formed (one-piece) device.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, which is intended merely to be illustrative, but rather comprehends the subject matter defined by the following claims.

What is claimed is:

1. In a projection-display system for receiving a first light beam embodying a first image from a video device and for enlarging said image to a second image to be embodied in a second light beam adapted for projection onto a screen, said system comprising:
   a polarized beam splitter (PBS) for separating the first light beam into a reflected spolarized light wave and a transmitted P polarized light wave;
   delay means for creating a half wavelength delay between the reflected S polarized light wave and the transmitted P polarized light wave;
   direction-modifying means for changing the direction of the transmitted P polarized light wave in such manner that it becomes parallel to, and travels in the same direction as, the reflected S polarized light wave; and
   a condenser for condensing the reflected S polarized light wave and the transmitted P polarized light wave;
   the improvement comprising: an improved PBS-and-delay device (PDD), said PDD comprising an integrally-formed means for separating the first light beam into a reflected S polarized light wave and a transmitted P polarized light wave, and for creating a half wavelength delay between the reflected S polarized light wave and the transmitted P polarized light wave;
   the integrally-formed PDD comprises a generally planar transparent, dielectric medium having a predetermined thickness, a Brewster Angle characteristic of the medium, an upper surface and a lower surface;
   the upper surface of the PDD has a thin-film coating adapted for reflecting the S polarized light wave and for transmitting the P polarized light wave from the first light beam, when the PBS receives the first light beam at an angle of incidence equal to the Brewster Angle for said medium, to provide the PBS for the system; and
   the lower surface of the PDD has a thin-film coating substantially identical to the thin-film coating of the upper surface, whereby any refraction occurring during transmission of the P polarized light wave through the coating on the upper surface is canceled out by transmission of the P polarized light wave through the coating on the lower surface.

2. The apparatus of claim 1, wherein the PDD is integrally formed with the direction-modifying means to provide an integrally-formed PDD-and-direction-modifying device (PDMD), said PDMD comprising an integrally-formed means for separating the first light beam into the reflected S polarized light wave and the transmitted P polarized light wave, for creating the half wavelength delay between the reflected S polarized light wave and the transmitted P polarized light wave, and for changing the direction of the transmitted P polarized light wave in such manner that it becomes parallel to, and travels in the same direction as, the reflected S polarized light wave.

3. The apparatus of claim 2, wherein:
the integrally-formed PDMD comprises the generally planar transparent, dielectric medium having the predetermined thickness, the Brewster Angle characteristic of the medium, the upper surface and the lower surface; and
the predetermined thickness of the PDMD is such that it establishes a quarter wavelength phase difference during each transit through the medium by the transmitted P polarized light wave and each transit through the medium by the reflected P polarized light wave, to provide the delay means for the system.

4. The apparatus of claim 3, wherein the PDMD is made of one of crystalline quartz and polycarbonate film.

5. The apparatus of claim 1, wherein:
the predetermined thickness of the PDD is such that it establishes a half wavelength phase difference during transit through the medium by the transmitted P polarized light wave, to provide the delay means for the system; and
the transmitted P polarized light wave passes from the PDD to a reflecting mirror, to provide the direction-modifying means.

6. The apparatus of claim 5, wherein the PDMD is made of one of crystalline quartz and polycarbonate film.

7. In a projection-display method for receiving a first light beam embodying a first image from a video device and for enlarging said image to a second image to be embodied in a second light beam adapted for projection onto a screen, said method comprising:
(1) separating the first light beam into a reflected S polarized light wave and a transmitted P polarized light wave, by means of a polarized beam splitter (PBS);
(2) creating a half wavelength delay between the reflected S polarized light wave and the transmitted P polarized light wave;
(3) changing the direction of the transmitted P polarized light wave in such manner that it becomes parallel to, and travels in the same direction as, the reflected S polarized light wave; and
(4) condensing the reflected S polarized light wave and the transmitted P polarized light wave to provide an image adapted for enlargement and projection onto a screen;
the improvement comprising:
providing an integrally-formed means for separating the first light beam into a reflected S polarized light wave and a transmitted P polarized light wave, and for creating a half wavelength delay between the reflected S polarized light wave and the transmitted P polarized light wave, and performing steps (1) and (2) by feeding the first light beam to the integrally-formed means;
wherein to perform steps (1) and (2) the first light beam is fed to an integrally-formed, generally planar, transparent, dielectric medium having a predetermined thickness, an upper surface and a lower surface, and the following steps occur:
(a) the first light beam strikes the upper surface of the medium at an angle of incidence equal to the Brewster Angle for said medium, said upper surface having a thin-film coating that splits the first light beam into (i) a reflected S polarized light wave and (ii) a transmitted P polarized light wave;
(b) the transmitted P polarized light wave then passes through the medium, the predetermined thickness of which is such that the transmitted P polarized light wave is delayed by a half wavelength phase difference with respect to the reflected S polarized light wave.

8. The method of claim 7, wherein the following step also occurs:
(c) the transmitted P polarized light wave then passes through a thin-film coating on the lower surface of the medium, said coating being substantially identical to the thin-film coating of the upper surface, whereby any refraction occurring during transmission of the P polarized light wave through the coating on the upper surface is canceled out by transmission of the P polarized light wave through the coating on the lower surface.

9. In a projection-display method for receiving a first light beam embodying a first image from a video device and for enlarging said image to a second image to be embodied in a second light beam adapted for projection onto a screen, said method comprising:
(1) separating the first light beam into a reflected S polarized light wave and a transmitted P polarized light wave, by means of a polarized beam splitter (PBS);
(2) creating a half wavelength delay between the reflected S polarized light wave and the transmitted P polarized light wave;
(3) changing the direction of the transmitted P polarized light wave in such manner that it becomes parallel to, and travels in the same direction as, the reflected S polarized light wave; and
(4) condensing the reflected S polarized light wave and the transmitted P polarized light wave to provide an image adapted for enlargement and projection onto a screen;
the improvement comprising:
providing an integrally-formed means for separating the first light beam into a reflected S polarized light wave and a transmitted P polarized light wave, for creating a half wavelength delay between the reflected S polarized light wave and the transmitted P polarized light wave, and for changing the direction of the transmitted P polarized light wave in such manner that it becomes parallel to, and travels in the same direction as, the reflected S polarized light wave, and performing steps (1), (2) and (3) by feeding the first light beam to the integrally-formed means;
wherein to perform the steps (1), (2) and (3), the first light beam is fed to an integrally-formed generally planar, transparent, dielectric medium having a predetermined thickness, an upper surface and a lower surface, and:
(a) the first light beam strikes the upper surface of the medium at an angle of incidence equal to the Brewster Angle for said medium, said upper surface having a thin-film coating that splits the first light beam into (i) a reflected S polarized light wave and (ii) a transmitted P polarized light wave; and (b) the transmitted P polarized light wave then passes through the medium, the predetermined thickness of which is such that the transmitted P polarized light wave is delayed by a quarter wavelength phase difference with respect to the reflected S polarized light wave.

10. The method of claim 9, wherein:

(c) the transmitted P polarized light wave then reflects off the lower surface of the medium, said lower surface having a thin-film coating adapted for substantially fully-mirror-reflecting the transmitted P polarized light wave.

11. The method of claim 10, wherein:

(d) the transmitted P polarized light wave then again passes through the medium, whereby the transmitted P polarized light wave is delayed by a further quarter wavelength phase difference with respect to the reflected S polarized light wave.

12. The method of claim 11, wherein:

(e) the transmitted P polarized light wave then again passes through the thin-film coating of the upper surface, whereby any refraction occurring during prior transmission of the P polarized light wave through the coating on the upper surface is canceled out.

13. The method of claim 9, wherein:

(c) the transmitted P polarized light wave then again passes through the medium, whereby the transmitted P polarized light wave is delayed by a further quarter wavelength phase difference with respect to the reflected S polarized light wave.

14. The method of claim 13, wherein:

(d) the transmitted P polarized light wave then again passes through the thin-film coating of the upper surface, whereby any refraction occurring during prior transmission of the P polarized light wave through the coating on the upper surface is canceled out.

15. The method of claim 9, wherein:

(c) the transmitted P polarized light wave then again passes through the thin-film coating of the upper surface, whereby any refraction occurring during prior transmission of the P polarized light wave through the coating on the upper surface is canceled out.

* * * * *